(12) United States Patent
Suzuki et al.

(10) Patent No.: US 8,654,544 B2
(45) Date of Patent: Feb. 18, 2014

(54) ELECTRONIC APPARATUS

(75) Inventors: Takashi Suzuki, Kawasaki (JP);
Yoshifumi Kajiwara, Kawasaki (JP);
Hiroyuki Takita, Kawasaki (JP);
Kazuhiro Tada, Kawasaki (JP); Hiroshi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 13/427,578

(22) Filed: Mar. 22, 2012

(65) Prior Publication Data

US 2012/0247992 A1 Oct. 4, 2012

(30) Foreign Application Priority Data

Mar. 31, 2011 (JP) ................................. 2011-077402

(51) Int. Cl.
*H04B 1/03* (2006.01)

(52) U.S. Cl.
USPC ......... 361/814; 361/679.01; 455/566; 174/50

(58) Field of Classification Search
USPC ............. 174/50; 361/679.01, 814; 455/575.1, 455/566
See application file for complete search history.

(56) References Cited

U.S. PATENT DOCUMENTS

| | | | |
|---|---|---|---|
| 7,561,443 B2 * | 7/2009 | Todoroki et al. | 361/814 |
| 2007/0243912 A1 * | 10/2007 | Lee et al. | 455/575.4 |
| 2008/0137310 A1 | 6/2008 | Todoroki | |

FOREIGN PATENT DOCUMENTS

JP 2008-147867 A 6/2008

\* cited by examiner

*Primary Examiner* — Dhirubhai R Patel
(74) *Attorney, Agent, or Firm* — Maschoff Brennan

(57) ABSTRACT

An electronic apparatus includes: a first casing; a second casing; a support member, disposed on the second casing, to support the first casing; a slide rail, engaged with the support member, to support the first casing such that the first casing becomes slidable; and a slide stopper, disposed on the slide rail, to include a stopper surface for the support member and a projecting portion that separates a first end side of the first casing from the second casing.

12 Claims, 18 Drawing Sheets

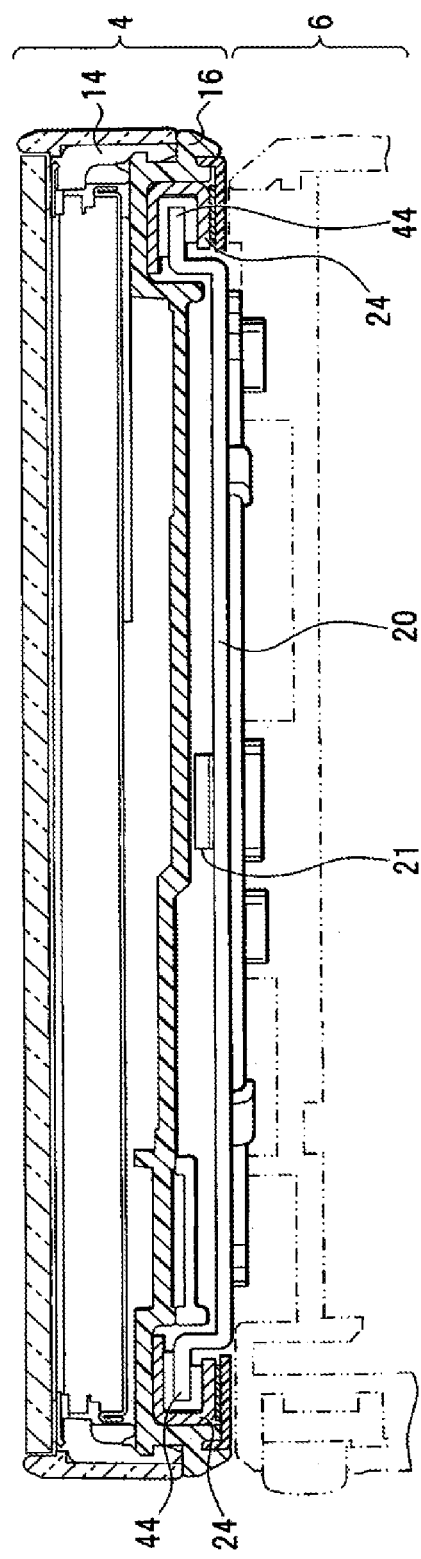

ELECTRONIC APPARATUS

CROSS-REFERENCE TO RELATED APPLICATION

This application is based upon and claims the benefit of priority of the prior Japanese Patent Application No. 2011-77402, filed on Mar. 31, 2011, the entire contents of which are incorporated herein by reference.

FIELD

The embodiments discussed herein are related to an electronic apparatus.

BACKGROUND

An electronic apparatus, such as a cellular phone, may include a plurality of casings. The plurality of casings are coupled to each other via a slide unit or the like and are opened or closed by sliding of the casing. In operations of opening and closing such a slide-type electronic apparatus, a sliding operation may be stopped by coupling between the stoppers of the casings.

A related art is discussed in, for example, Japanese Laid-open Patent Publication No. 2008-147867.

SUMMARY

According to one aspect of the embodiments, an electronic apparatus includes: a first casing; a second casing; a support member, disposed on the second casing, to support the first casing; a slide rail, engaged with the support member, to support the first casing such that the first casing becomes slidable; and a slide stopper, disposed on the slide rail, to include a stopper surface for the support member and a projecting portion that separates a first end side of the first casing from the second casing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates an exemplary slide module.

DESCRIPTION OF EMBODIMENTS

For an electronic apparatus that includes slidable casings, in a closed state, an operation other than sliding of a first casing with respect to a second casing, for example, an operation for reducing opening may be performed. In a slide-type electronic apparatus, for example, to reduce a state where a slide rail or a peripheral component is exposed to the outside in an opened state, a pad may be disposed on an opposed surface of a casing. In the slide-type electronic apparatus, for example, a unit that reduces opening and the pad may be integrated. The pad may be removed depending on the magnitude of a force on the unit that reduces opening, the frequency of occurrences of the operation for reducing opening, or the like. Removal of the pad may make the sliding operation of the casing difficult.

An impact on a stopper that stops sliding of the casing may be conveyed to the pad, and the pad may be removed. In an operation of closing the casings, a large impact sound may occur.

Figure 1:
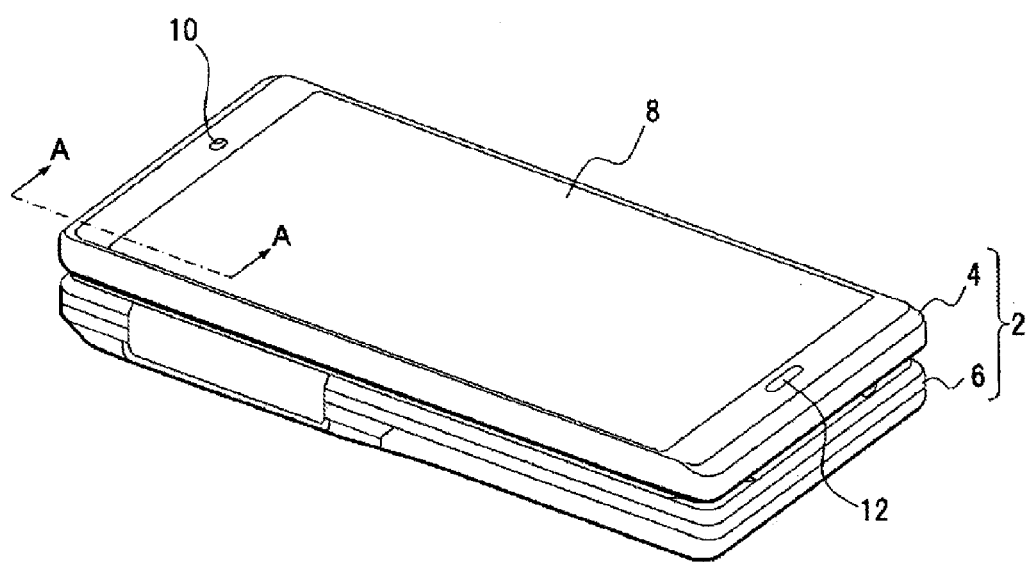
FIG. 1 illustrates an exemplary cellular phone.
Figure 2:
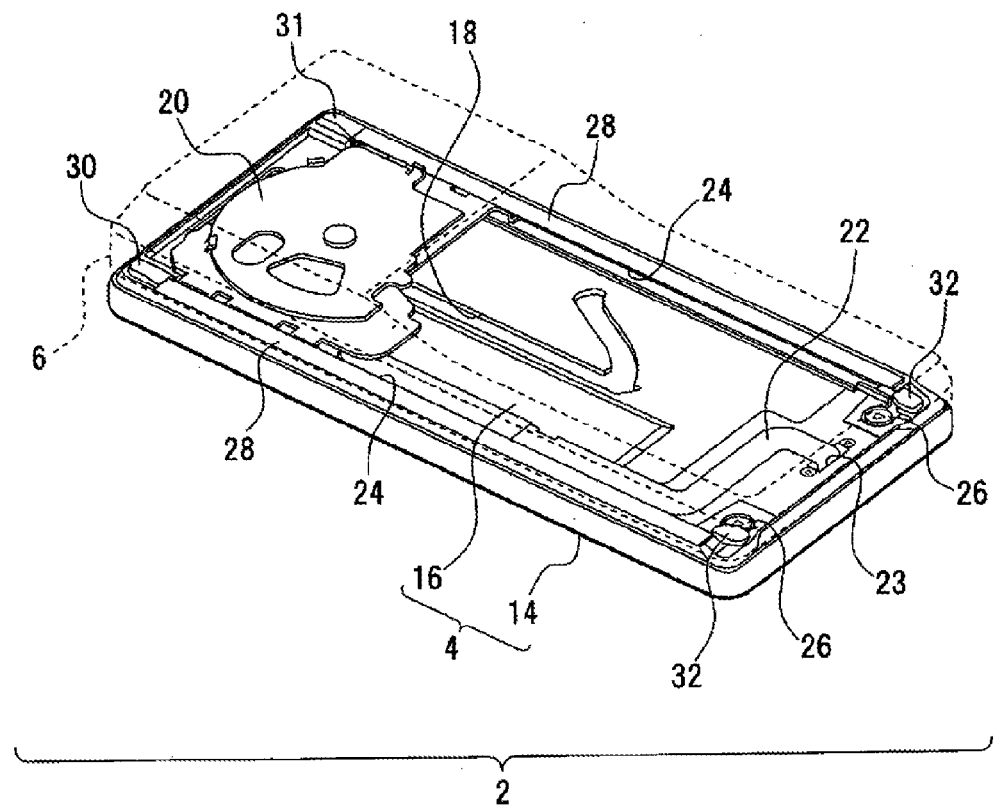
FIG. 2 illustrates an exemplary slide mechanism.
Figure 3:
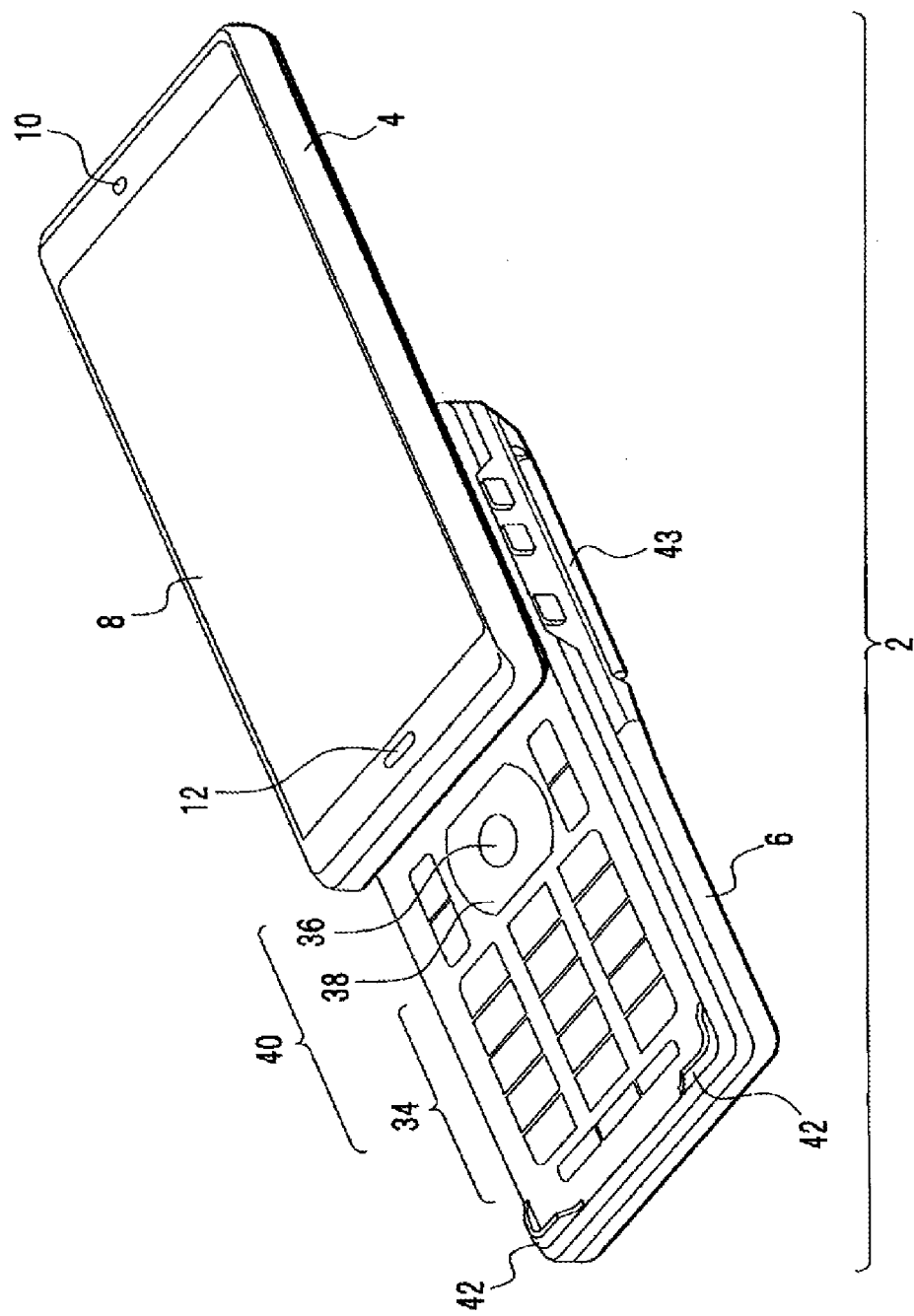
FIG. 3 illustrates an exemplary cellular phone.

FIG. 1 illustrates an exemplary cellular phone. FIG. 1 illustrates an external configuration of the cellular phone. FIG. 2 illustrates an exemplary slide mechanism. FIG. 2 illustrates the slide mechanism of the cellular phone in a closed state. FIG. 3 illustrates an exemplary cellular phone. FIG. 3 illustrates an external configuration of the cellular phone in an opened state.

A cellular phone 2 may include a first casing portion 4 and a second casing portion 6, for example. The first casing portion 4 and the second casing portion 6 are stacked such that they slide in a longitudinal direction, as illustrated in FIG. 3. The first casing portion 4 may correspond to a display-side casing portion, and the second casing portion 6 may correspond to an operation-side casing portion, for example.

The first casing portion 4 may correspond to a movable-side casing portion that slides with respect to the second casing portion 6, for example. The first casing portion 4 may include a movable front case 14 and a movable rear case 16, which are superimposed, as illustrated in FIG. 2, for example. The first casing portion 4 incorporates a substrate section on which functional components are implemented. For example, a liquid crystal display (LCD) panel, a camera, a microphone or a receiver corresponding to an antenna functional component or a telephone functional component, and other parts are implemented on the substrate section.

The movable front case 14 in the first casing portion 4 includes a display window section 8 in which the LCD panel of the substrate section is arranged, and information is displayed on the LCD panel. A touch panel module may be disposed in the display window section 8, for example, and may receive an operated input. The first casing portion 4 may have a sound-emitting opening 10 including a receiver or a sound-absorbing opening 12 including a microphone on its front or rear end in its longitudinal direction.

A locking pawl, a watertight member and the like are provided in the lateral inner portion of the movable front case 14. The locking pawl is the one for locking the movable front case 14 on the movable rear case 16 or the substrate section. The watertight member is the one for reducing an entry of water or the like into the first casing portion 4 from the outer side.

The movable rear case 16 illustrated in FIG. 2 may correspond to a back case of the first casing portion 4, for example. The movable rear case 16 includes a guide groove 18 configured to guide the first casing portion 4 sliding with respect to the second casing portion 6. The guide groove 18 may cause a guide shaft 21 (FIG. 4) disposed on a slide module 20 of the second casing portion 6 to slide. The slide module 20 may be fixed to the second casing portion 6 and may correspond to a support member that supports sliding movement of the first casing portion 4. The slide module 20 may guide the first casing portion 4 sliding in the longitudinal direction of the cellular phone 2 so as to reduce entanglement of a cable 22. The first casing portion 4 may move transversely with respect to the second casing portion 6 after sliding in the longitudinal direction of the cellular phone 2, for example. In the transverse movement, rotation of a part of the slide module 20 along the guide groove 18 may reduce entanglement of the cable or the like.

The substrate section is placed and held in the movable rear case 16. The first casing portion 4 may have an insertion hole 23 that allows the cable 22 for electrically coupling the first casing portion 4 and the second casing portion 6 to pass therethrough, for example. The movable front case 14 and the movable rear case 16 may include a molding member including a resin material, such as polycarbonate.

The cable 22 may be a flexible cable including a synthetic resin, for example. A connector for coupling to the substrate section and the like placed in the first casing portion 4 and the second casing portion 6 may be disposed on each of both ends of the cable 22. A water stopping component for reducing an entry of water or the like into the movable rear case 16 may be disposed in the insertion hole 23, for example.

The movable rear case 16 may be provided with slide rails 24 for enabling the slide module 20 to slide, for example. The slide rails 24 are engaged with the slide module 20, and the slide module 20 slides along the slide rails 24, thus making the first casing portion 4 slidable. Slide stoppers 30 and 31 configured to stop sliding of the slide module 20 are placed on the leading ends of the slide rails 24. When the cellular phone 2 is brought into a closed state, the slide module 20 moves toward the slide stoppers 30 and 31 and stops. At this time, the upper surfaces of the slide stoppers 30 and 31 may come into contact with the upper surface of the second casing portion 6.

Because the slide stoppers 30 and 31 of the first casing portion 4 are in contact with the second casing portion 6 when the cellular phone 2 is in a closed state, an operation of separating the microphone side of the first casing portion 4 toward the upward direction of the second casing portion 6 by a user, for example, an opening operation may be reduced.

A locking pawls 32 that is locked on each of locking portions 42 (FIG. 3) on the upper surface of the second casing portion 6 is disposed adjacent to the rear end of each of the slide rails 24. The locking pawl 32 is locked on the locking portion 42 when the cellular phone 2 is in a closed state, whereby separation of the first casing portion 4 and the second casing portion 6 toward substantially vertical directions or the like may be reduced, for example. The locking pawl 32 illustrated in FIG. 2 may face the upper surface of the second casing portion 6 irrespective of whether the cellular phone 2 is in a closed state or an opened state, for example.

A pad 28 may be disposed on each of the slide rails 24 on a surface that faces the second casing portion 6, for example. The movable front case 14 and the movable rear case 16 may be secured with, for example, a fixing unit 26, such as a screw or a bolt, or may be coupled together by a pressing pin or the like.

The first casing portion 4 is stacked over the second casing portion 6, for example. Because the upper surface of the second casing portion 6 is covered with the first casing portion 4 in a closed state, a contact operation may not be performed. As illustrated in FIG. 3, when the first casing portion 4 slides in the longitudinal direction, for example, the upper surface of the second casing portion 6 is exposed. The second casing portion 6 may correspond to an operation-side casing portion of the cellular phone 2 and may be a fixed-side casing portion with respect to the sliding first casing portion 4. The second casing portion 6 includes a key pad 40. The key pad 40 may include numeric keys 34, an enter key 36, and a cursor key 38, for example.

The plurality of locking portions 42 may be disposed on an end of the upper surface of the second casing portion 6, for example. When the cellular phone 2 is in a closed state, each of the locking portions 42 is locked on the corresponding locking pawl 32 (FIG. 2) of the first casing portion 4. An antenna 43 configured to transmit and receive television data or a data signal may be disposed on a lateral portion.

For the cellular phone 2, for example, when it is in a closed state, a communication function or a display function of displaying a Web site or mail may be used. In a closed state, the touch panel in the display window section 8 is used and the cellular phone 2 is operated.

Figure 4:
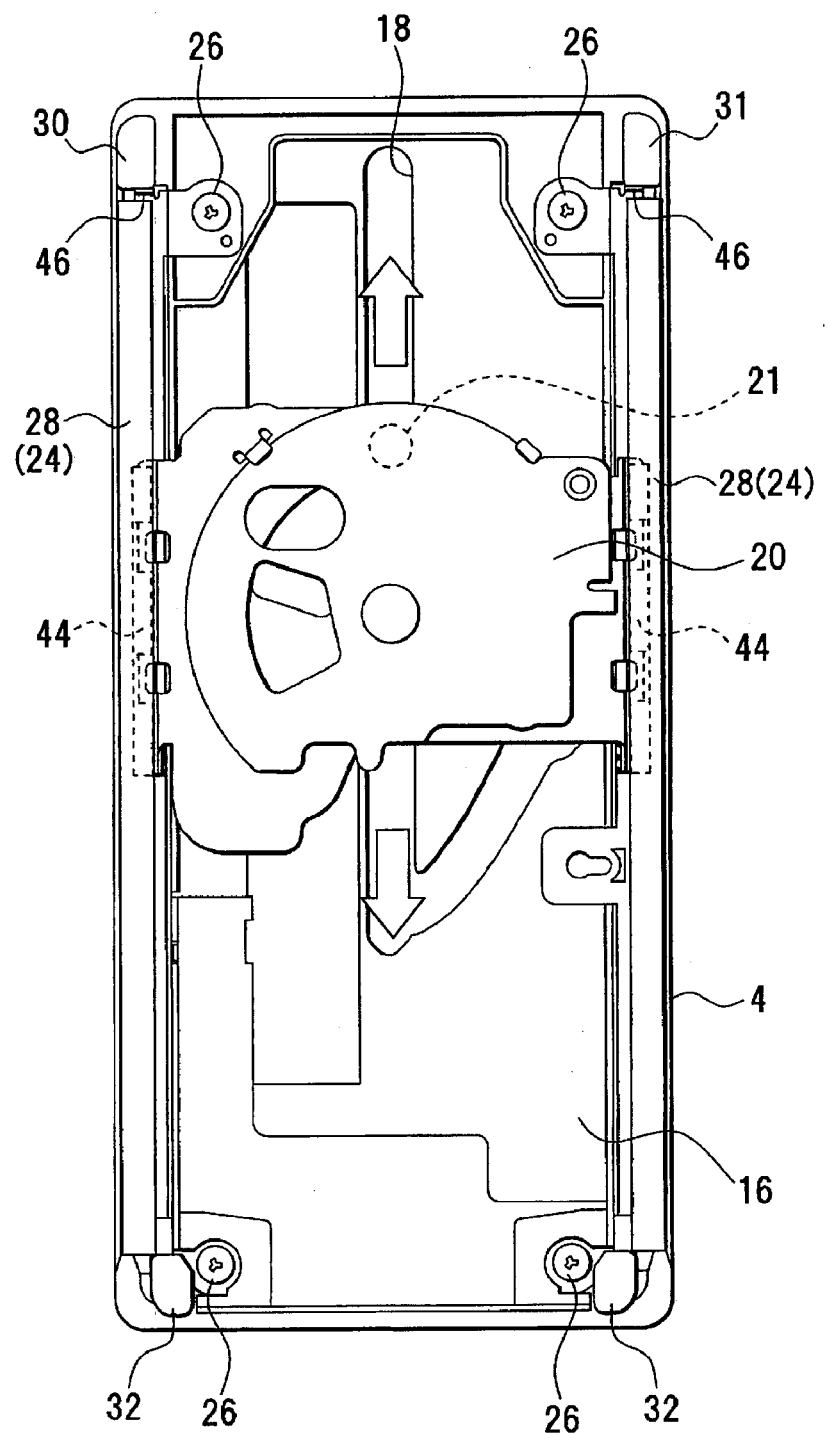
FIG. 4 illustrates an exemplary slide rail and an exemplary slide module.
Figure 5:
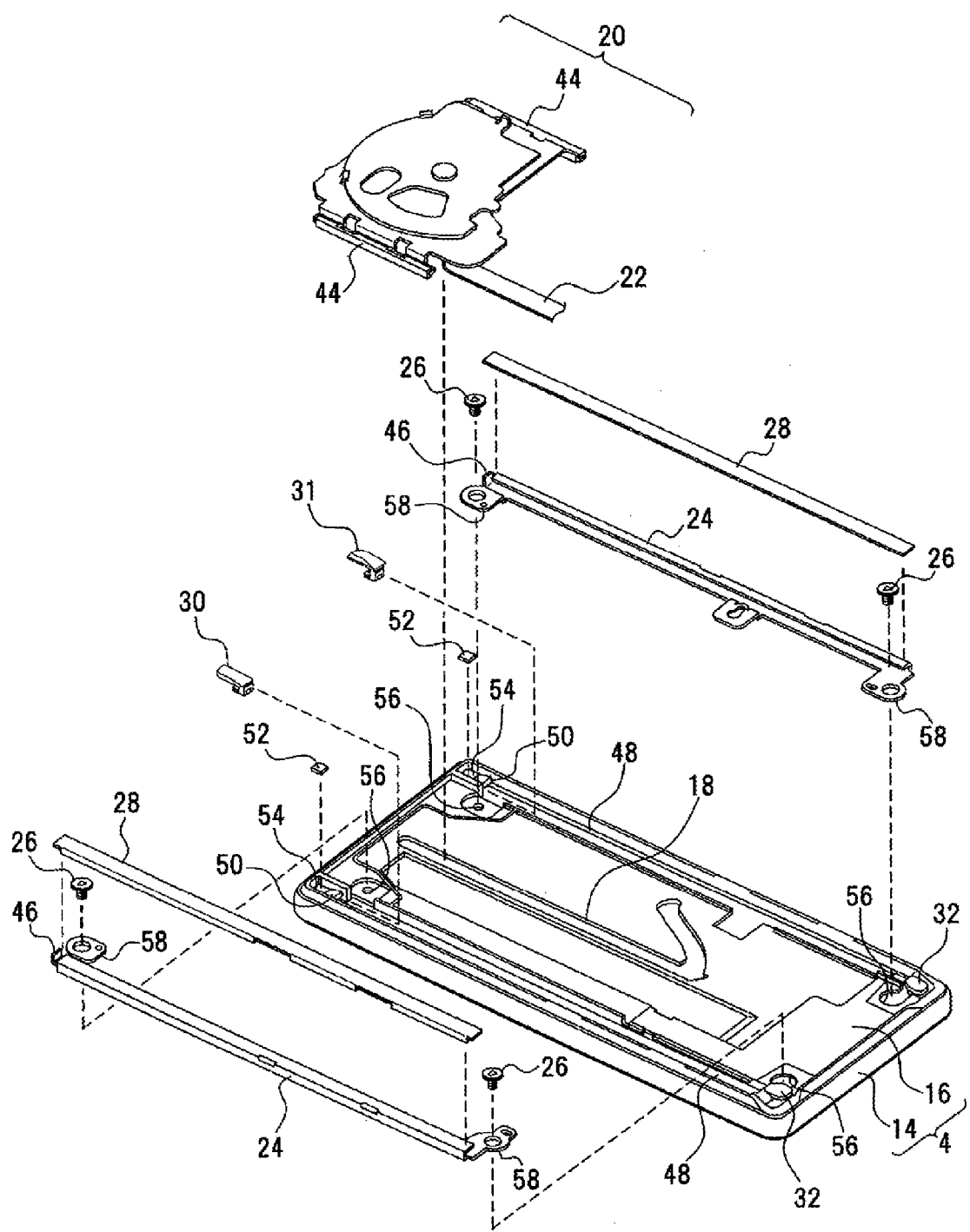
FIG. 5 illustrates an exemplary casing portion.
Figure 6:
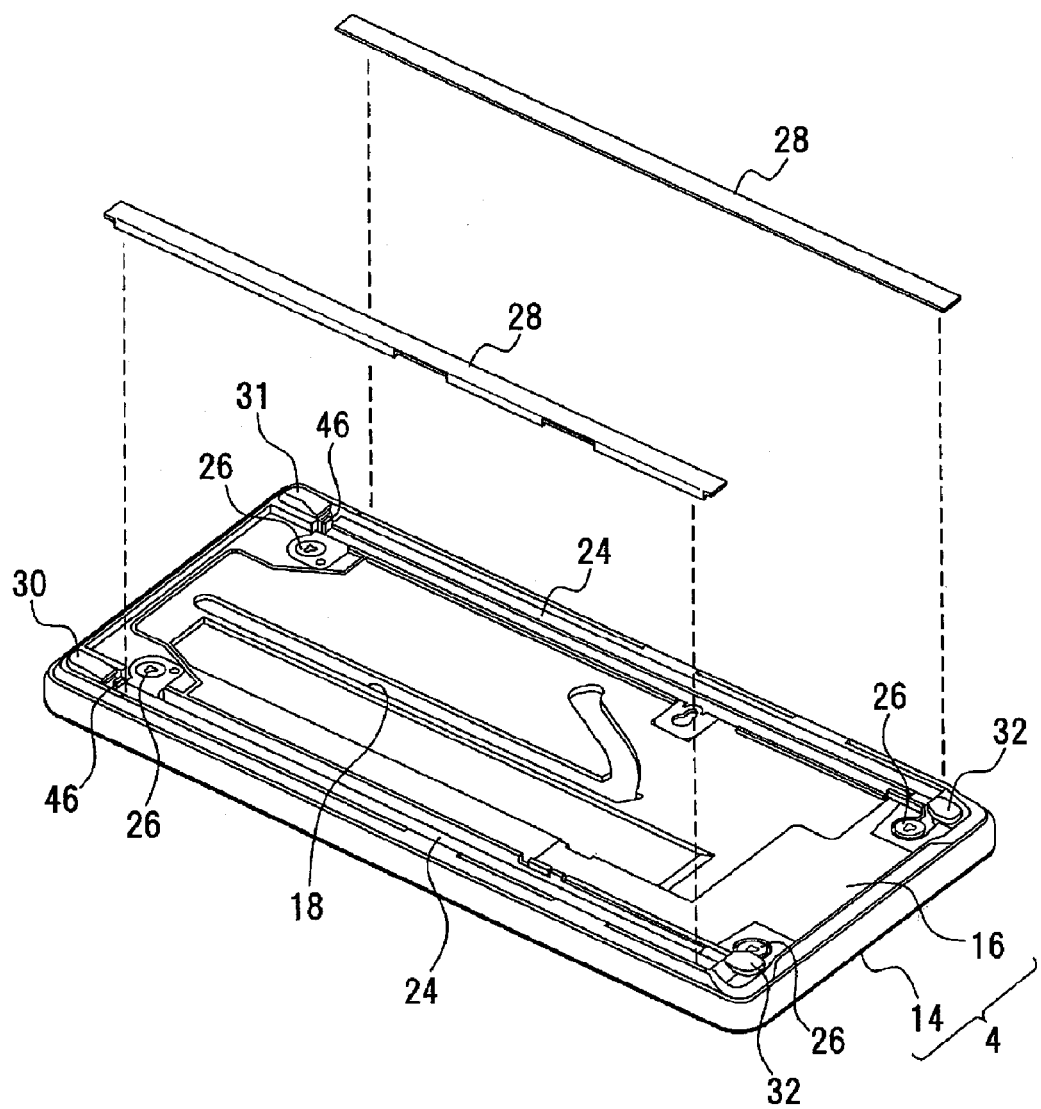
FIG. 6 illustrates an exemplary slide rail.

FIG. 4 illustrates an exemplary slide rail and an exemplary slide module. FIG. 5 illustrates an exemplary casing portion. FIG. 6 illustrates an exemplary slide rail. FIG. 4 illustrates an engagement state of the slide module with respect to the slide rails. FIG. 5 illustrates an exploded state of the first casing portion illustrated in FIG. 1, 2, or 3, for example. FIG. 6 illustrates a placement state of the slide rails.

The first casing portion 4 illustrated in FIG. 4 may be supported by the slide module 20 disposed on the second casing portion 6, for example, and locked on the slide rail 24. This enables the first casing portion 4 to slide. For example, slide portions 44 on both sides of the slide module 20 are inserted in the slide rails 24, and an operation of opening and closing the cellular phone 2 causes the slide portions 44 to slide in the slide rails 24 in the forward and backward directions.

Each of the slide rails 24 may be provided with a stopper 46 for stopping the sliding operation of the corresponding slide portion 44 adjacent to the leading end of the first casing portion 4.

When the cellular phone 2 is brought into an opened state, for example, the slide module 20 may move toward the rear end of the first casing portion 4 and the slide portions 44 may come into contact with the respective locking pawls 32. When the cellular phone 2 is brought into a closed state, the slide module 20 may move toward the leading end of the first casing portion 4 and come into contact with each of the stoppers 46. For example, the stopper 46 may also be disposed on the rear end of the slide rail 24. When the cellular phone 2 is brought into a closed state, the slide module 20 may come into contact with the stopper.

The cable 22 illustrated in FIG. 2 may extend to the second casing portion 6 through from the insertion hole 23 of the first casing portion 4 to the slide module 20. The cable 22 is not exposed to the outside from the back side of the first casing portion 4 in opening and closing operations of the cellular phone 2.

The guide groove 18 including a straight line section and an oblique section coupled to the straight line section may be disposed in a central portion on the front surface of the movable rear case 16 illustrated in FIG. 5 and extend in the longitudinal direction. A housing portion 48 for housing the slide rail 24 is disposed adjacent to the end of the movable rear case 16 in the longitudinal direction. The housing portion 48 is provided with a fitting protruding portion 50 for fitting each of the slide stoppers 30 and 31 on the leading end side of the first casing portion 4. A mounting portion 54 configured to mount a cushioning member 52 as an elastic member is disposed between the movable rear case 16 and each of the slide stoppers 30 and 31.

The movable rear case 16 may include fixing holes 56 for securing the slide rail 24 by the fixing units 26 adjacent to the front and rear ends of the housing portion 48, for example. The slide rail 24 includes fixing sides 58. The fixing sides 58 may be placed in the respective fixing holes 56, for example. The fixing units 26 are disposed inside the respective fixing holes 56, and the fixing sides 58 are positioned therebetween. Each of the fixing units 26 fixes the slide rail 24 to the movable rear case 16 and fixes the movable rear case 16, the movable front case 14, and the substrate section and other sections incorporated in the movable front case 14.

The slide rail 24 may include a metal material, such as stainless steel, for example. The slide rail 24 includes a groove section that has a substantially C cross-sectional shape and that supports the slide portion 44 of the slide module 20 such that the slide portion 44 slides. Each of the fixing sides 58 on the front and back ends of the slide rail 24 in the longitudinal direction includes a through hole that allows the fixing unit 26 to pass therethrough. The fixing unit 26 is locked on the fixing side 58.

In a process of assembling slide components of the movable rear case 16, for example, after the locking pawls 32 are placed on the rear end sides of the accommodation portions 48, the fixing sides 58 of the slide rails 24 are arranged in alignment with the fixing holes 56 of the movable rear case 16 and the slide rails 24 are placed. The slide stoppers 30 and 31 are placed on the leading end sides of the housing portions 48 in alignment with the fitting protruding portions 50. The fixing units 26 are aligned with the locations of the fixing holes 56 such that the fixing units 26 are secured to the fixing holes 56 via the fixing slides 58.

After placement of the slide rails 24, the locking pawls 32, and the slide stoppers 30 and 31, as illustrated in FIG. 6, the pads 28 are placed on the upper surfaces of the slide rails 24. The pads 28 may be disposed to reduce situations where the slide rails 24 and the second casing portion 6 come into contact with each other. The pads 28 cover the upper surfaces of the slide rails 24 and reduce situations where the slide rails 24 are exposed to the outside when the cellular phone 2 is in an opened state. Each of the pads 28 may include a resin material, such as polyoxymethylene (POM), and be placed on the slide rail 24 with, for example, sticky tape or an adhesive disposed therebetween.

Figure 7:
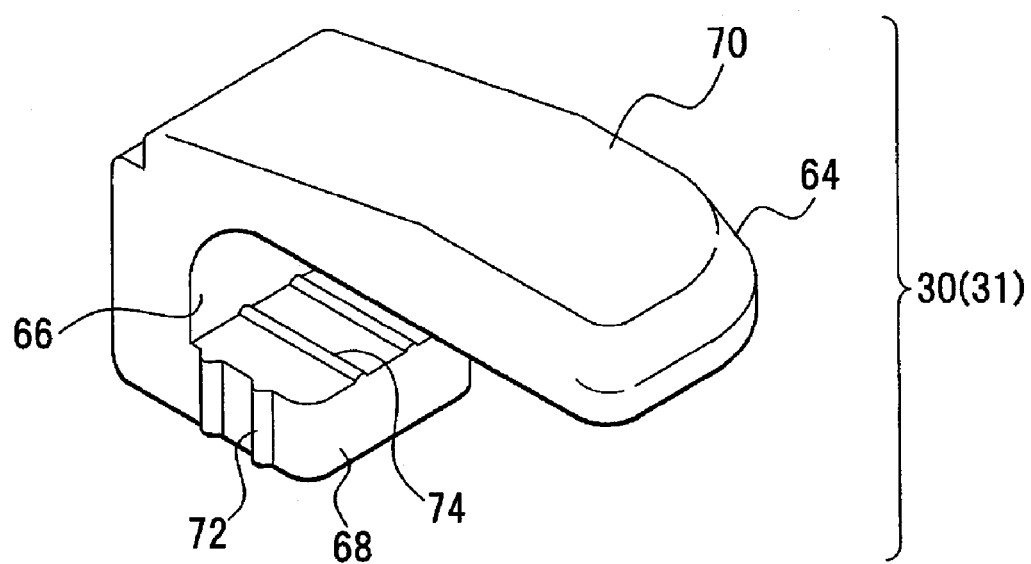
FIG. 7 illustrates an exemplary slide stopper.
Figure 8:
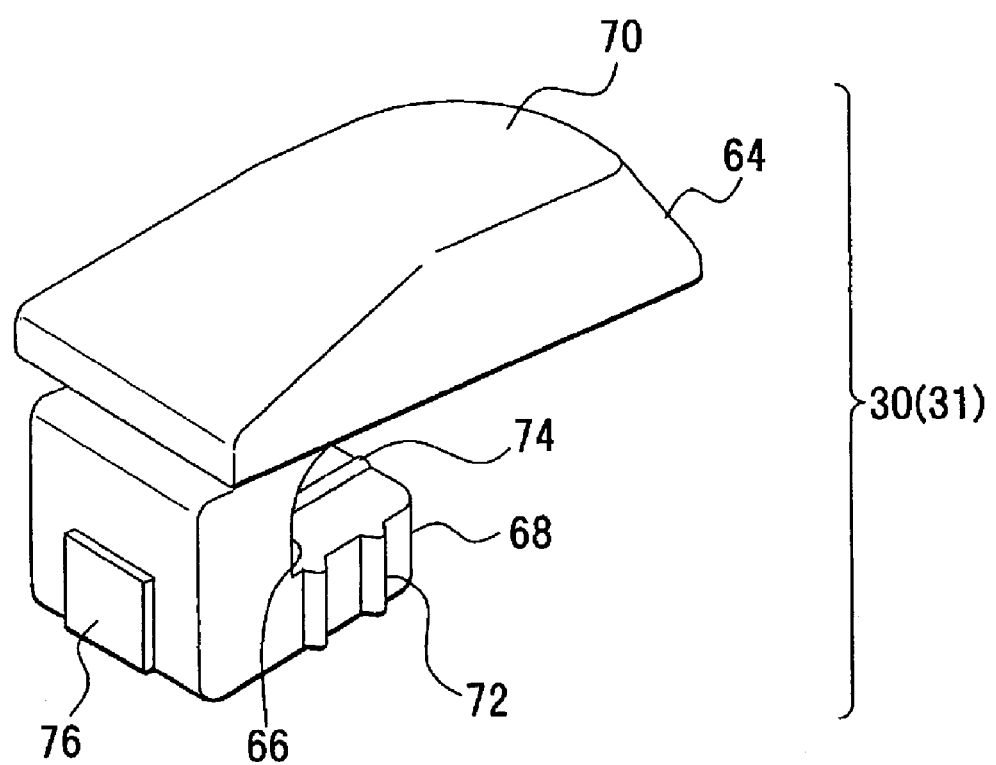
FIG. 8 illustrates an exemplary slide stopper.
Figure 9:
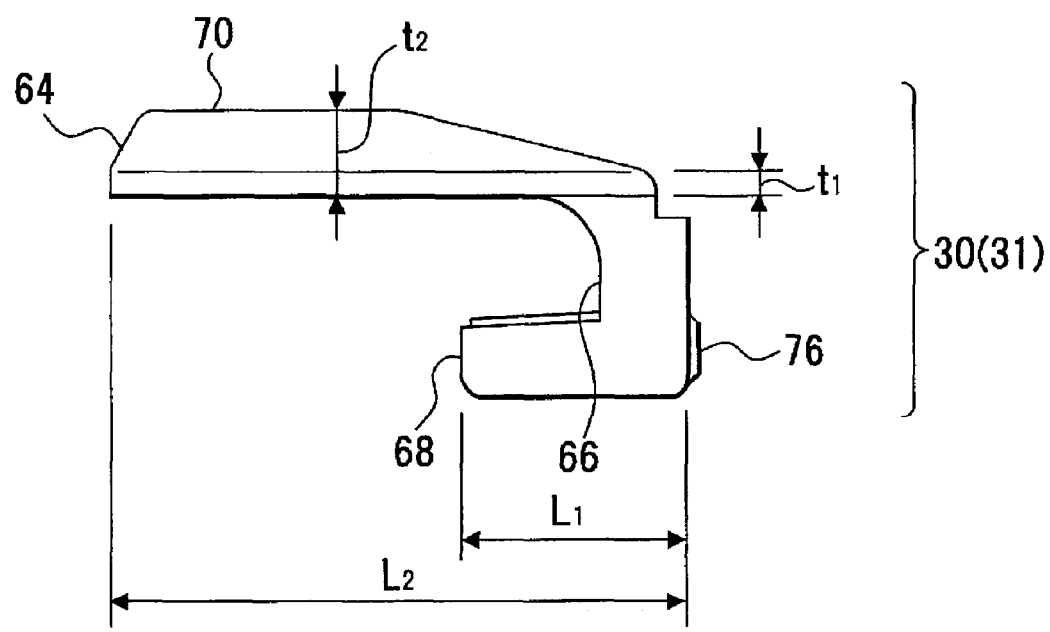
FIG. 9 illustrates an exemplary slide stopper.
Figure 10:
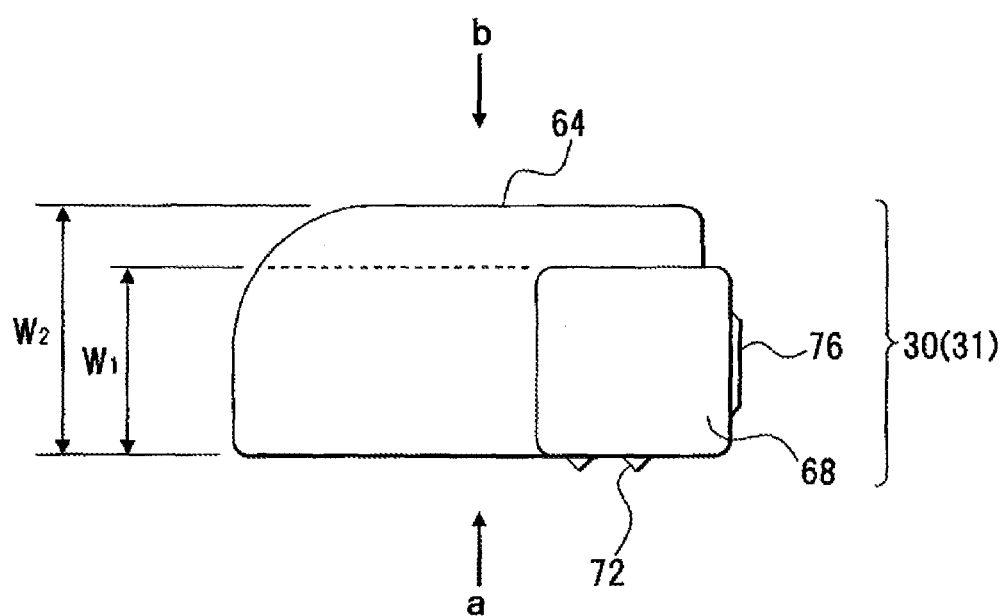
FIG. 10 illustrates an exemplary slide stopper.
Figure 11A:
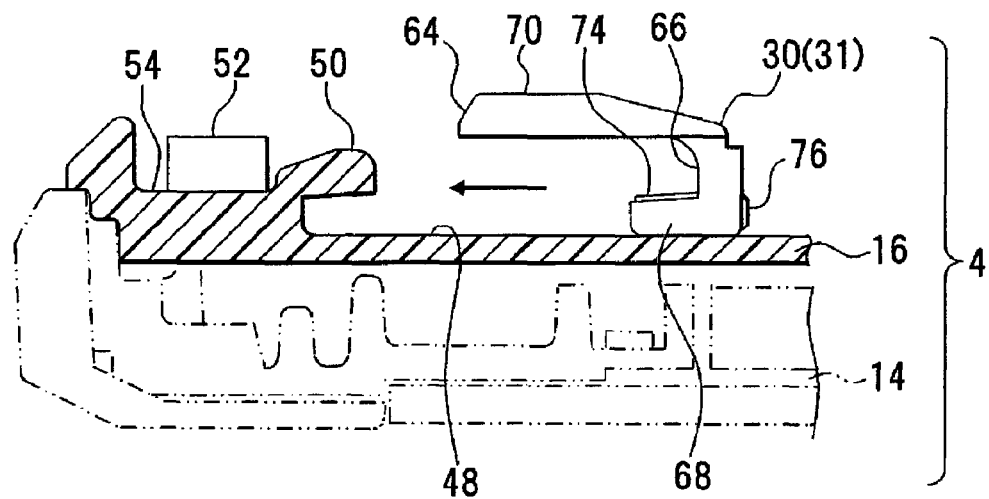
FIGS. 11A and 11B illustrate an exemplary placement of a slide stopper.
Figure 11B:
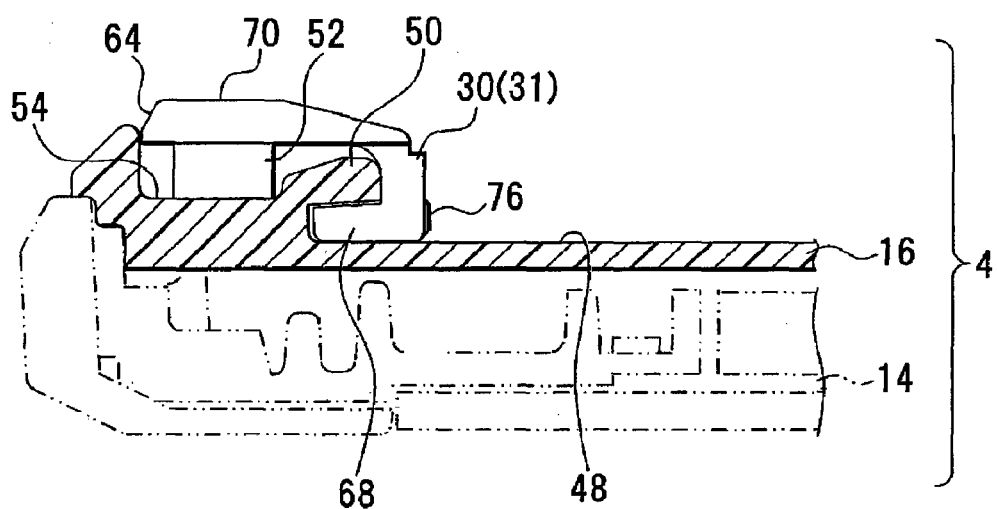

FIGS. 7, 8, 9, and 10 illustrate an exemplary slide stopper. FIG. 7 illustrates a right lateral portion and a front portion of the slide stopper. FIG. 8 illustrates the right lateral portion and a back portion of the slide stopper. FIG. 9 illustrates a left lateral portion of the slide stopper. FIG. 10 illustrates a bottom portion of the slide stopper. FIGS. 11A and 11B illustrate an exemplary placement of the slide stopper. In the example illustrated in FIGS. 11A and 11B, the slide stopper is placed on the movable rear case.

Each of the slide stoppers 30 and 31 may stop a sliding operation of the slide module 20 caused by an operation of closing the first casing portion 4 and may also reduce opening of the first casing portion 4 and the second casing portion 6. Each of the slide stoppers 30 and 31 illustrated in FIG. 7 may include a contact portion 64, a main body portion 66, and a bottom portion 68, for example. The contact portion 64 is exposed to the back side of the first casing portion 4 and comes into contact with the second casing portion 6. The main body portion 66 is in contact with the fitting protruding portion 50 of the movable rear case 16. The bottom portion 68 is in contact with the front surface of the movable rear case 16. For example, the contact portion 64, the main body portion 66, and the bottom portion 68 of each of the slide stoppers 30 and 31 may correspond to a fitting portion that is fitted to the fitting protruding portion 50, for example.

The contact portion 64 includes a projecting portion 70 configured to separate the leading end side of the first casing portion 4 from the second casing portion 6. The projecting portion 70 is positioned between the first casing portion 4 and the second casing portion 6 when they are in a closed state. The projecting portion 70 may be higher than the sliding surface of the contact portion 64 and may become the highest when the first casing portion 4 and the second casing portion 6 are in a closed state, for example.

One or more ribs 72 are provided in a lateral surface of the bottom portion 68. One or more ribs 74 are provided in an upper surface of the bottom portion 68. The ribs 72 are used in locking the slide stopper on the accommodation portion 48, and the ribs 74 are used in locking the slide stopper on a part of the fitting protruding portion 50. Each of the slide stoppers 30 and 31 may include resin, such as polyoxymethylene (POM). The ribs 72 and 74 may be integrated. The slide stoppers 30 and 31 may be substantially symmetrical with each other.

The main body portion 66 illustrated in FIG. 8 may include a stopper surface 76 adjacent to the slide rail 24, for example. The stopper surface 76 may come into contact with the stopper 46 corresponding to a wall portion of the slide rail 24, receive a shock caused by contact with the slide portion 44, and stop a sliding operation of the slide module 20. The projecting portion 70 of the contact portion 64 is disposed in a direction that intersects the stopper surface 76. The stopper surface 76 may include substantially the same material as the main body portion 66 and may be integrated with the main body portion 66. The stopper surface 76 may include an elastic member, such as rubber or a spring, to absorb a shock caused by the slide module 20.

As illustrated in FIG. 9, in the contact portion 64 of each of the slide stoppers 30 and 31, the thickness of the portion of connection with the main body portion 66 may be $t_1$, and the thickness of the central portion of the contact portion 64 may be $t_2$, for example. The thicknesses may be set such that $t_2 > t_1$ is satisfied. The thicknesses may gradually increase in the projecting portion 70. For example, the thickness of the contact portion 64 from the central portion toward the leading end may be $t_2$.

In the projecting portion 70, the thickness may gradually increase and may become the largest at the leading end side of the contact portion 64, for example.

For the slide stoppers 30 and 31, the length of the bottom portion 68 may be set at $L_1$, and the length of the contact portion 64 may be set at $L_2$, for example. The lengths may be set such that $L_2 > L_1$ is satisfied, and the contact portion 64 may be longer than the bottom portion 68.

As in the case of FIGS. 7 and 8, the slide stopper 30 illustrated in FIG. 10 may be formed such that the contact portion 64 and the bottom portion 68 flush with each other on the right lateral side (in the direction "a"). The width of the bottom portion 68 may be substantially the same as that of the main body portion 66. The width of the bottom portion 68 may be set at $W_1$, the width of the contact portion 64 may be set at $W_2$, and $W_2 > W_1$ may be satisfied, for example. In the slide stopper 30, the contact portion 64 is longer than the bottom portion 68, and the area of the portion where the contact portion 64 is in contact with the second casing portion 6 is larger. The width $W_1$ of each of the bottom portion 68 and the main body portion 66 may be substantially the same as the breadth of the slide rail 24, for example, and the area of the portion being in contact with the slide portion 44 is ensured. The slide stopper 31 may be substantially symmetrical with the slide stopper 30. For example, the contact portion 64 and the bottom portion 68 in the slide stopper 31 may be flush with each other on the left lateral side indicated by the direction "b" illustrated in FIG. 10.

The width $W_1$ of each of the bottom portion 68 and the main body portion 66 may be substantially the same as the width $W_2$ of the contact portion 64.

In placing each of the slide stoppers 30 and 31 on the movable rear case 16, as illustrated in FIG. 11A, after the cushioning member 52 is placed on the mounting portion 54, each of the slide stoppers 30 and 31 is press-fitted such that the main body portion 66 comes into contact with the fitting protruding portion 50. At this time, as illustrated in FIG. 11B, the ribs 74 of the bottom portion 68 are locked on the lower portion of the fitting protruding portion 50. This enables each of the slide stoppers 30 and 31 to be press-fitted to the location where the contact portion 64 covers the cushioning member 52 and enables an elastic member to be present between the first casing portion 4 and each of the slide stoppers 30 and 31. The slide stoppers 30 and 31 are elastically supported on the first casing portion 4. For example, when the microphone side of the first casing portion 4 is raised and an opening operation from the second casing portion 6 illustrated in FIG. 2 is performed, the contact portion 64 is pushed down toward the movable rear case 16 and the cushioning member 52 is pressed. At this time, the contact portion 64 applies a reaction force resulting from an elastic force of the cushioning member 52 to the second casing portion 6.

Figure 12A:
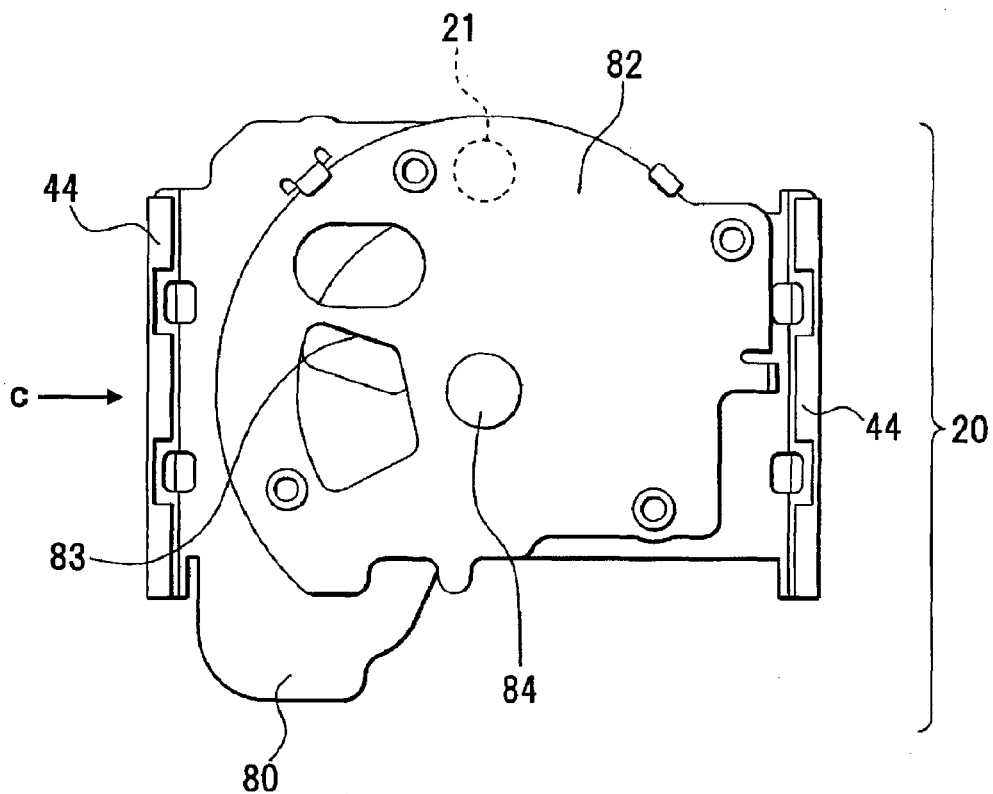
FIGS. 12A and 12B illustrate an exemplary slide module.
Figure 12B:
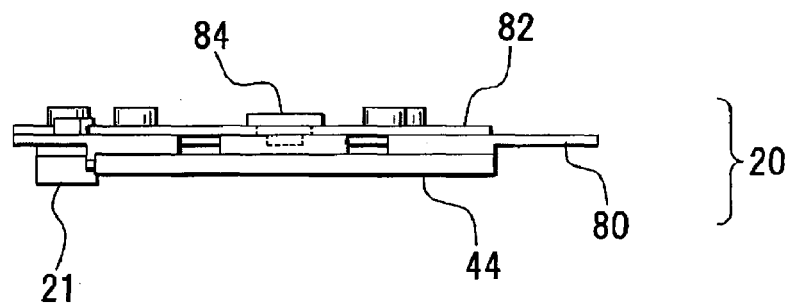
Figure 14:
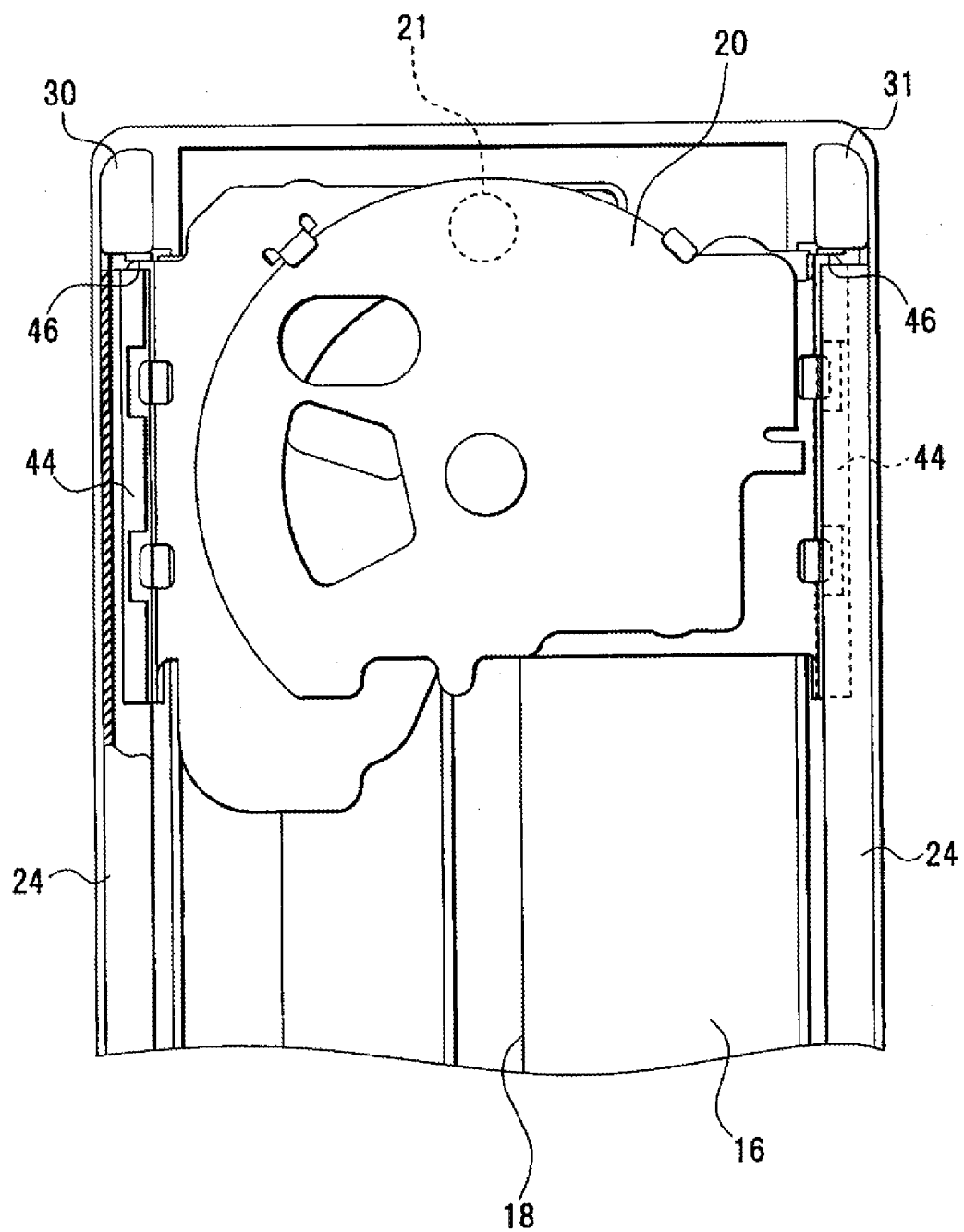
FIG. 14 illustrates an exemplary slide module and an exemplary slide stopper.

FIGS. 12A, 12B, and 13 illustrate an exemplary slide module. FIG. 13 illustrates a cross section of the slide module. FIG. 14 illustrates an exemplary slide module and an exemplary slide stopper. FIG. 14 illustrates a contact state between the slide module and the slide stoppers of the cellular phone in a closed state.

The slide module 20 illustrated in FIG. 12A includes a fixing portion 80 including the slide portions 44 on its both ends and a rotatable portion 82 that is fixed to the second casing portion 6. The slide portions 44 are disposed on both ends of the fixing portion 80. In order that the slide module 20 slides between the slide rails 24, the breadth of the fixing portion 80 may correspond to the gap between the slide rails 24. The fixing portion 80 may include a metallic material, such as stainless steel, for example. The fixing portion 80 and the slide portions 44 may be integrated, for example.

The fixing portion 80 includes the rotatable portion 82 that is fixed to the second casing portion 6, allows the cable 22 to pass through an opening 83, and guides the cable 22 into the second casing portion 6. The guide shaft 21 extending toward the first casing portion 4 is placed on the rotatable portion 82. When the rotatable portion 82 is rotated by a rotation shaft 84 on the fixing portion 80 by a certain amount, the first casing portion 4 slides transversally with respect to the second casing portion 6.

The slide module illustrated in FIG. 12B may correspond to the slide module seen from the arrow C illustrated in FIG. 12A. The slide portion 44 illustrated in FIG. 12B may be lower than the fixing portion 80, for example. When the slide module 20 is placed on the first casing portion 4, a space may be present so as to separate the bottom of the fixing portion 80 from the movable rear case 16.

As illustrated in FIG. 13, the second casing portion 6 is coupled to the first casing portion 4 via the slide module 20. At this time, the rotatable portion 82 of the slide module 20 is fixed to the second casing portion 6, the slide portions 44 of the fixing portion 80 are locked on the slide rails 24, and additionally, the guide shaft 21 slides along the guide groove 18 of the movable rear case 16 illustrated in FIG. 2.

The first casing portion 4 and the second casing portion 6 slide along the longitudinal direction such that the slide module 20 is disposed therebetween, and an operation of opening and closing the cellular phone 2 is performed. When the cellular phone 2 is in a closed state, for example, when the lateral portion of the first casing portion 4 and that of the second casing portion 6 are flush with each other, as illustrated in FIG. 14, the slide module 20 moves to the leading end side of the first casing portion 4 and stops. In this state, the slide portions 44 may come into contact with the stoppers 46 of the slide rails 24 and a shock caused by the sliding action may be received by the stopper surfaces 76 of the slide stoppers 30 and 31.

Figure 15:
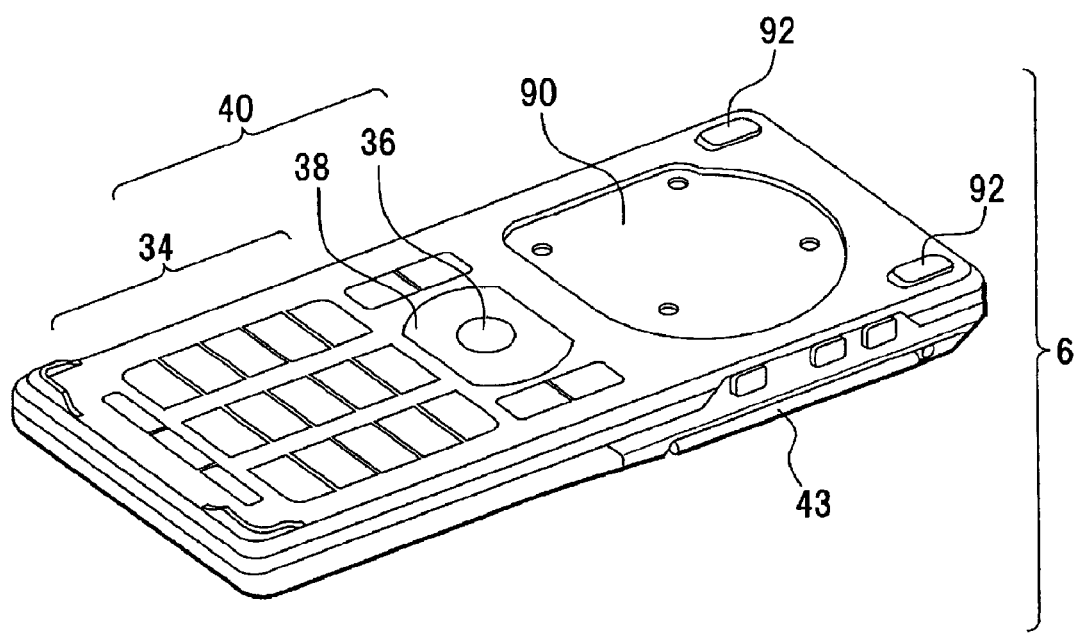
FIG. 15 illustrates an exemplary casing portion.
Figure 16A:
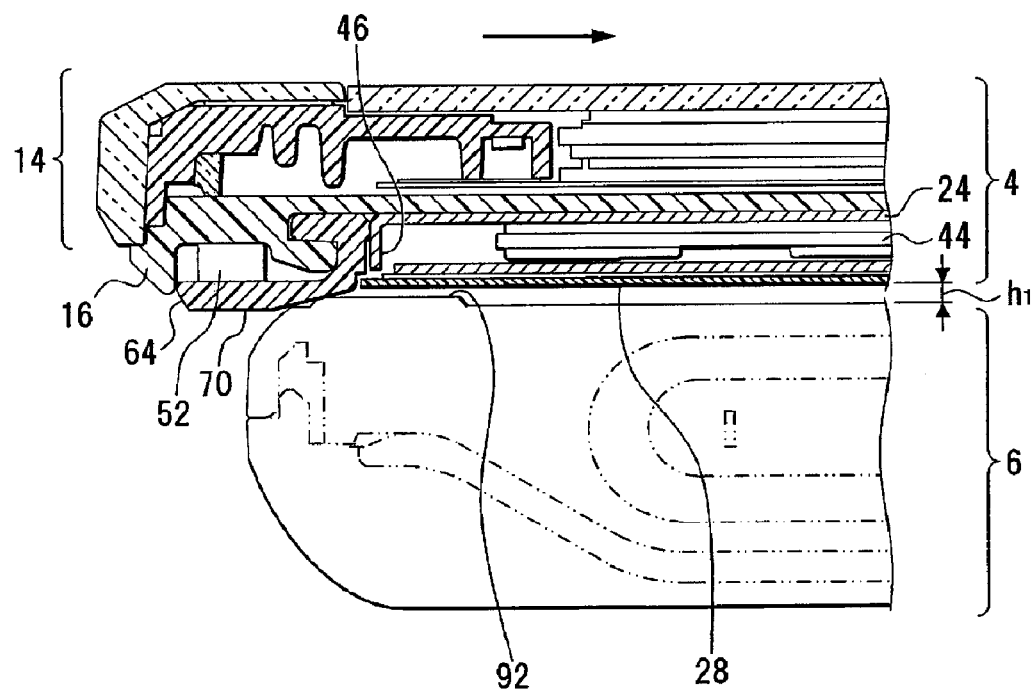
FIGS. 16A and 16B illustrate an exemplary structure for reducing opening.
Figure 16B:
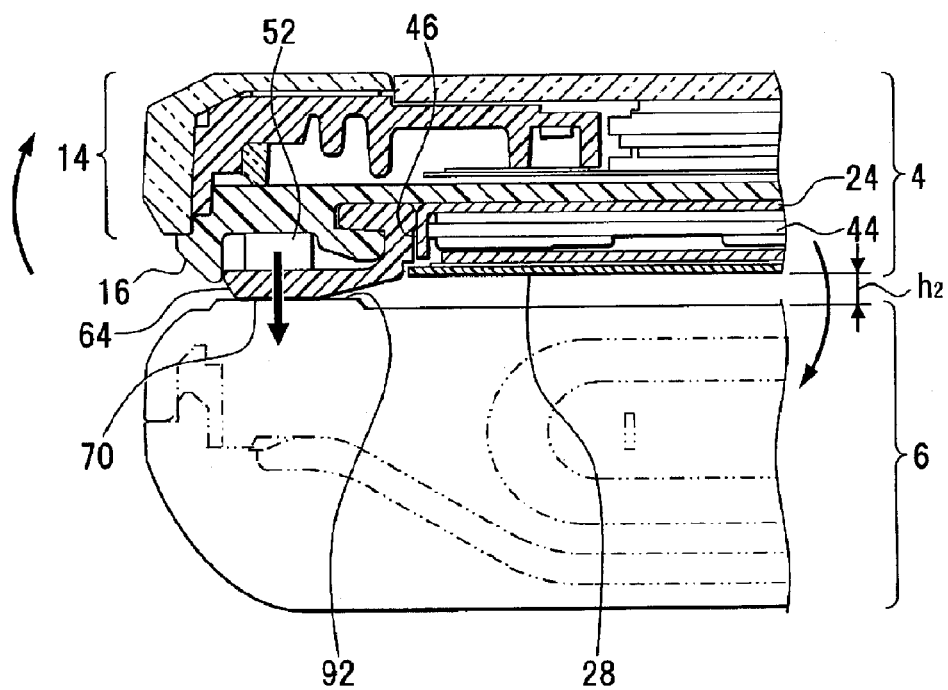

FIG. 15 illustrates an exemplary casing portion. FIGS. 16A and 16B illustrate an exemplary structure for reducing opening. FIGS. 16A and 16B illustrate a state in which opening is reduced by an operation of closing the cellular phone. FIGS. 16A and 16B correspond to a cross section taken along the line A-A illustrated in FIG. 1.

The second casing portion 6 illustrated in FIG. 15 may include a module placement portion 90 on which the slide module 20 is placed, for example. The second casing portion 6 and the slide module 20 may be secured with a fixing unit, such as a screw or a bolt, for example. The second casing portion 6 may include two projecting portions 92 on the leading end side. The projecting portions 92 may correspond to a coupling protrusion, come into contact with the contact portion 64, and allow the contact portion 64 to slide. The projecting portions 92 may be integrated with the surface cover of the second casing portion 6, for example. The second casing portion 6 may include a member that includes a buffering material for absorbing a shock caused by contact with the first casing portion 4.

The module placement portion 90 and the projecting portions 92 may be covered with the first casing portion 4 and may not be exposed to the outside, as illustrated in FIG. 3.

As illustrated in FIG. 16A, when an operation of closing the cellular phone 2 is performed and the first casing portion 4 slides toward the second casing portion 6, the contact portions 64 of the slide stoppers 30 and 31 come into contact with the projecting portions 92 of the second casing portion 6. When the first casing portion 4 slides, as illustrated in FIG. 16B, the projecting portions 92 slide on the projecting portions 70 of the contact portions 64. The amount of the projection of the projecting portions 70 increases in an increase in the area where the first casing portion 4 and the second casing portion 6 overlap each other, and, for example, the leading end side of the first casing portion 4 rises with respect to the second casing portion 6. For example, $h_2 > h_1$ may be satisfied where $h_1$ is the distance between the leading end portion of the first casing portion 4 and that of the second casing portion 6 when the cellular phone 2 is in an opened state and $h_2$ is that distance when the cellular phone 2 is in a closed state. The difference between the distances in opened and closed states results from the height of the projecting portion 70 of each of the slide stoppers 30 and 31, and the relationship $(h_2 - h_1) \approx (t_2 - t_1)$ (FIG. 9) may be satisfied, for example.

When the cellular phone 2 is brought into a closed state, the slide portion 44 comes into contact with the stopper 46 of the slide rail 24 and the sliding movement of the first casing portion 4 is stopped. The projecting portions 92 of the second casing portion 6 are arranged on the projecting portions 70 of the slide stoppers 30 and 31, and the distance between the leading end side of the first casing portion 4 and that of the second casing portion 6 is the longest. At this time, the rear end side of the first casing portion 4, which is not illustrated, is pushed down toward the second casing portion 6 and approaches the second casing portion 6. In this manner, the leading end side of each of the first casing portion 4 and the second casing portion 6 may be raised and opening on the rear end side may be reduced. For example, when a user performs an opening operation, a reaction force of the cushioning members 52 acts toward the second casing portion 6 with respect to the slide stoppers 30 and 31 between the first casing portion 4 and the second casing portion 6. Thus the projecting portions 70 are pushed back toward the second casing portion 6 and separation of the first casing portion 4 and the second casing portion 6 on the rear end side is reduced.

Because the slide stoppers are fixed to the casing, a reaction force that separates the first casing from the second casing may be supplied without the influence of a placement state of the pads or the like and the function of reducing opening may be maintained.

Because the pads do not receive a force from the slide stoppers for reducing opening, removal of the pads from the slide rails or damage to the pads may be reduced. Difficulty in sliding movement of the casing portion caused by removal of or damage to the pads may be reduced.

If a huge shock is provided in an operation of opening and closing the casings, because the slide module does not come into contact with the casing portion and the shock is received by the slide stoppers and the cushioning members, damage to the casing portions may be reduced.

When the casing portions are in a closed state, a shock caused by contact between the slide module and the slide stoppers is not conveyed to the pads, removal of or damage to the pads may be reduced.

Because the slide module is received by the slide stoppers and does not hit on the casing, the occurrence of a hitting sound may be reduced.

Because the projecting portions 70 for reducing opening when the first casing portion 4 and the second casing portion 6 are in a closed state and the pads 28 of the movable rear case 16 are separated, a rise in the pads 28 may be reduced. Because the stopper surfaces 76 for the slide portions 44 are included in the slide stoppers 30 and 31 corresponding to the projecting portions 70, a hitting sound caused by an operation of closing the first casing portion 4 and the second casing portion 6 may be reduced.

Because the pads 28 and the projecting portions 70 for reducing opening are separated, when the projecting portions 70 are pressed by an opening operation, a force may not be conveyed to the pads 28.

The slide stopper 30 or 31 including the projecting portion 70 may include a hard elastomer. The surface pressed into the movable rear case 16 may be the stopper surface 76 for the slide module 20.

For example, as the cellular phone illustrated above, a personal computer (PC) that includes slidable first casing portion and second casing portion may be used. A portable game machine or a personal digital assistant (PDA) that includes slidable casing portions may also be used. An electronic device that includes a structure for reducing opening and a casing portion including a stopper for a slide module may also be used.

Figure 17:
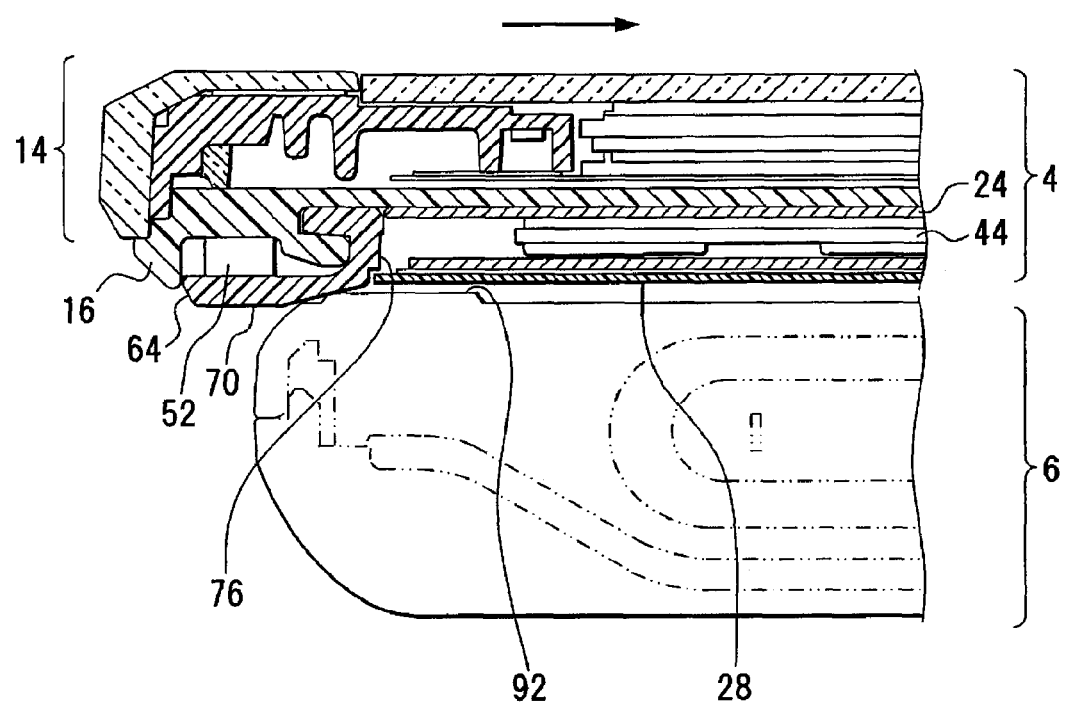
FIG. 17 illustrates an exemplary slide rail.

FIG. 17 illustrates an exemplary slide rail. In FIG. 17, the stopper illustrated in FIGS. 16A and 16B may not be included. When the cellular phone 2 is in a closed state, the slide portions 44 may come into contact with the stopper surfaces 76 of the slide stoppers 30 and 31. Because a shock occurring when the slide portions 44 are stopped is not conveyed to the pads 28, removal of or damage to the pads 28 may be reduced. Because the slide portions 44 do not come into contact with the casing, such as the movable rear case 16, an impact sound caused by a closing operation may be reduced.

The slide rails 24 and the slide stoppers 30 and 31 and the like are placed on the first casing portion 4, and the slide module 20 is placed on the second casing portion 6. For example, a unit for reducing opening or for a stopper may be placed on the second casing portion. In place of the locking pawls 32 placed on the rear end side of the movable rear case 16 illustrated in FIG. 2, 4, 5, or 6, the slide stoppers 30 and 31 may be placed on both leading end side and rear end side of the slide rails 24.

Figure 18A:
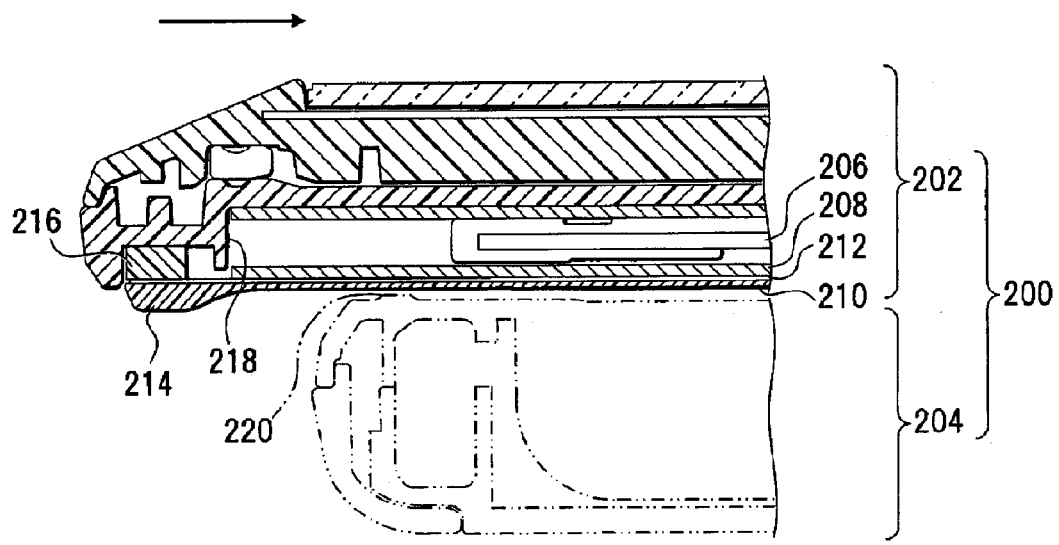
FIGS. 18A and 18B illustrate an exemplary structure for reducing opening.
Figure 18B:
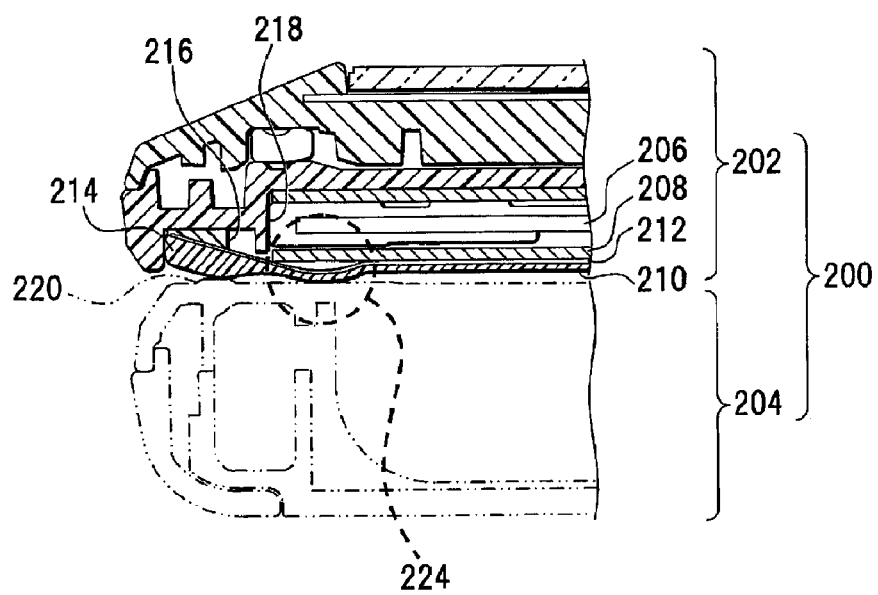

FIGS. 18A and 18B illustrate an exemplary structure for reducing opening.

In an electronic apparatus 200, a first casing portion 202 and a second casing portion 204 are slidably placed. The first casing portion 202 includes a slide rail 208 that guides a slider portion 206 of the second casing portion 204 and enables the slider portion 206 to slide. A slide pad 210 is disposed on a surface of the slide rail 208 that faces the second casing portion 204.

The slide pad 210 is fixed to the slide rail 208 with an adhesive 212. A projecting portion 214 for reducing opening is disposed on the leading end of the slide pad 210. The slide pad and the structure for reducing opening are integrated. The projecting portion 214 is placed on the first casing portion 202 such that a cushioning member 216 is disposed therebetween.

When the electronic apparatus 200 is in a closed state, the projecting portion 214 is in contact with a contact portion 220 disposed on a part of the leading end side of the second casing portion 204.

A pressure applied from the second casing portion 204 to the projecting portion 214 is conveyed to the slide pad 210. For example, influence from the strength of an operation of opening and closing the electronic apparatus 200, changes over time, or the like may produce a gap between the slide pad 210 and the adhesive 212 or deteriorate the adhesive strength. For example, as illustrated in FIG. 18B, because the leading end is sunk when the projection for reducing opening is pressed into the second casing portion 204, a removal portion 224 may be produced between the slide pad 210 and the adhesive 212 by leverage.

In the electronic apparatus 200, because the slider portion 206 comes into contact with a stopper wall 218 of the first casing portion 202 and a sliding operation is stopped, a hitting sound or a vibration caused by a closing operation may be propagated to the entire electronic apparatus. If the electronic apparatus 200 falls, a considerable shock may be provided, and the stopper wall 218 may be broken by the slider portion 206.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
   a first casing;
   a second casing;
   a support member, disposed on the second casing and by which the first casing is supported, the support member being configured to support the first casing at a position that is between the second casing;
   a slide rail, disposed on the first casing and engaged with a slide portion included in the support member, the slide rail configured to support the first casing such that the first casing becomes slidable; and
   a slide stopper disposed on the slide rail and including a stopper surface configured to receive the slide portion of the support member, the slide stopper further including a projecting portion that is provided at a higher position than the stopper surface and projects toward the second casing to separate a first end side of the first casing from the second casing.

2. The electronic apparatus according to claim 1, wherein the projecting portion is disposed in a direction that intersects the stopper surface and is positioned between the first casing and the second casing when the first casing is closed with respect to the second casing.

3. The electronic apparatus according to claim 1, further comprising, an elastic member disposed between the slide stopper and the first casing.

4. The electronic apparatus according to claim 1, further comprising, a fitting portion, disposed in the slide stopper, to fit the slide stopper to the first casing.

5. The electronic apparatus according to claim 4, wherein the slide stopper is fixed to the first casing by a fit of the fitting portion.

6. The electronic apparatus according to claim 1, wherein the second casing includes a coupling protrusion on a surface that faces the first casing.

7. The electronic apparatus according to claim 6, wherein the coupling protrusion is coupled to the projecting portion in a position where the first casing is closed with respect to the second casing.

8. The electronic apparatus according to claim 1, further comprising,
   a wall portion, provided in the slide rail, to come into contact with the support member to stop a slide when the first casing is closed with respect to the second casing.

9. The electronic apparatus according to claim 8, wherein the wall portion makes a surface come into contact with the slide stopper, the surface being opposite to a surface which comes into contact with the support member.

10. The electronic apparatus according to claim 8, wherein the wall portion is disposed on at least one of or both ends of the slide rail.

11. The electronic apparatus according to claim 1, wherein the slide stopper includes a sliding surface that slides on a part of the second casing.

12. The electronic apparatus according to claim 1, wherein an amount of projection of the projecting portion increases with an increase in an area where the first casing and the second casing overlap each other.

* * * * *